(12) United States Patent  
Chandrachood et al.

(10) Patent No.: US 8,531,945 B2  
(45) Date of Patent: Sep. 10, 2013

(54) METHOD AND APPARATUS TO SUPPORT DEEP PACKET INSPECTION IN A MOBILE NETWORK

(75) Inventors: Santosh Chandrachood, Milpitas, CA (US); Pawan Uberoy, San Jose, CA (US); Rehan Jalil, San Jose, CA (US)

(73) Assignee: WiChorus, Inc., Santa Clara, CA (US)

( * ) Notice: Subject to any disclaimer, the term of this patent is extended or adjusted under 35 U.S.C. 154(b) by 297 days.

(21) Appl. No.: 12/900,346

(22) Filed: Oct. 7, 2010

(65) Prior Publication Data

US 2011/0080886 A1    Apr. 7, 2011

Related U.S. Application Data

(60) Provisional application No. 61/278,519, filed on Oct. 7, 2009, provisional application No. 61/278,518, filed on Oct. 7, 2009.

(51) Int. Cl.  
*H04L 12/26* (2006.01)

(52) U.S. Cl.  
USPC .......................................... 370/229

(58) Field of Classification Search  
USPC ................. 370/229–232, 235, 310, 328, 329, 370/331, 464, 465, 474; 709/227–229  
See application file for complete search history.

(56) References Cited

U.S. PATENT DOCUMENTS

| | | | |
|---|---|---|---|
| 6,707,826 B1 * | 3/2004 | Gorday et al. | 370/468 |
| 7,076,551 B2 | 7/2006 | Gary | |
| 7,277,948 B2 | 10/2007 | Igarashi et al. | |
| 7,706,291 B2 * | 4/2010 | Luft et al. | 370/246 |
| 7,719,995 B2 * | 5/2010 | Luft | 370/252 |
| 7,733,891 B2 * | 6/2010 | Reynolds et al. | 370/412 |
| 7,773,510 B2 * | 8/2010 | Back et al. | 370/230 |
| 8,018,955 B2 * | 9/2011 | Agarwal et al. | 370/401 |
| 8,111,705 B1 * | 2/2012 | Bartlett et al. | 370/401 |
| 2001/0049753 A1 | 12/2001 | Gary | |

(Continued)

FOREIGN PATENT DOCUMENTS

WO    WO 2011/044396 A2    4/2011

OTHER PUBLICATIONS

Notification of Transmittal of the International Search Report and Written Opinion of the International Searching Authority; International Application No. PCT/US2010/051874, Date of Mailing: Jun. 30, 2011.

(Continued)

*Primary Examiner* — Dmitry H Levitan  
(74) *Attorney, Agent, or Firm* — Hamilton, Brook, Smith & Reynolds, P.C.

(57) ABSTRACT

As part of mobility management messaging in current systems, only static quality of service (QoS) profiles and their statically configured classifiers are reported. These classifiers are known a priori and are typically used for hosted traffic. Once advanced application classifiers are matched and mobility messaging is done, the deep packet inspection (DPI) learned subscriber context is lost. An embodiment of the invention is configured to associate DPI-learned dynamic classifiers with the classifier's policy information as payload over mobility management messaging. The embodiment is useful for identifying protocols and applications, for authentication purposes, solving congestion-based issues between elements in a network, guaranteeing QoS without reserving resources statically, attaching traffic packets to a particular subscriber, and creating mobile signaling to provision end-to-end communication in a network. Thereby enabling the transfer of subscriber parameters and information to be associated with the subscriber throughout subscriber movement through multiple elements of a network.

23 Claims, 7 Drawing Sheets

(56) References Cited

U.S. PATENT DOCUMENTS

| | | |
|---|---|---|
| 2008/0013470 A1 | 1/2008 | Kopplin |
| 2008/0137646 A1* | 6/2008 | Agarwal et al. ............... 370/352 |
| 2009/0086651 A1* | 4/2009 | Luft et al. ..................... 370/253 |
| 2009/0116513 A1 | 5/2009 | Gray et al. |
| 2009/0129271 A1 | 5/2009 | Ramankutty et al. |
| 2009/0285225 A1* | 11/2009 | Dahod ......................... 370/401 |
| 2011/0021236 A1 | 1/2011 | Dinan et al. |
| 2011/0085439 A1 | 4/2011 | Chandrachood |
| 2011/0085571 A1 | 4/2011 | Chandrachood |
| 2011/0087786 A1 | 4/2011 | Chandrachood |
| 2011/0087798 A1 | 4/2011 | Chandrachood |

OTHER PUBLICATIONS

International Preliminary Report on Patentability; International Application No. PCT/US2010/051874 Date of Mailing: Apr. 19, 2012.

* cited by examiner

METHOD AND APPARATUS TO SUPPORT DEEP PACKET INSPECTION IN A MOBILE NETWORK

RELATED APPLICATION

This application claims the benefit of U.S. Provisional Application No. 61/278,519, filed on Oct. 7, 2009 and U.S. Provisional Application No. 61/278,518, filed on Oct. 7, 2009, the entire teachings of which are incorporated herein by reference.

BACKGROUND OF THE INVENTION

In subscriber aware networks, such as Worldwide Interoperability for Microwave Access (WiMax) networks, High Speed Packet Access (HSPA) networks, $3^{rd}$ Generation Partnership Project Long Term Evolution (3GPP LTE) networks etc., voice is delivered as packetized data over a packet network. In a typical scenario for traditional voice call management, the service provider pre-allocates radio and other network resources in anticipation of a voice call that needs to be guaranteed a certain level of service. Making such guarantees locks up scarce resources until the voice call is actuality attempted. In addition, such subscriber-aware networks include classifiers set up as 5-tuple classifiers, which do not enable detection of advanced layer applications, such as the transport layer (Layer 4), session layer (Layer 5), presentation (Layer 6), and application layer (Layer 7) of the open systems interconnection (OSI) communications protocol stack.

SUMMARY OF THE INVENTION

Embodiments of the present invention include methods, apparatuses, and computer program products for dynamically adjusting network resources in a network node by performing deep packet inspection (DPI) on a traffic packet in the network. According to an example embodiment of the present invention, there is provided an apparatus, for example, a functional element in a network node that includes modules configured to adjust network resources. Specifically, a first module, a DPI module, which includes a DPI engine, which performs DPI on the traffic packet in the network node, where the node can be a subscriber-aware node, meaning the node can determine a subscriber profile and parameters associated therewith based on information in a traffic packet, and typically within an overhead portion of the traffic packet. The subscriber-aware node is provisioned as having access to modify network allocations. A second module, a notification module, is configured to notify a node in the network to adjust resource parameters based on information learned using the DPI engine, as well as any services that are available to a subscriber in the network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments of the present invention allow for subscriber awareness by pairing subscriber profiles to corresponding application information in a run-time way such that network resources are not consumed unnecessarily. Deep packet inspection of a subscriber's traffic packet detects the type of information packet being sent and notifies a base station to use a specific classifier in order to deliver service based on DPI-learned information and subscriber services. Such embodiments have an ability to attach DPI-learned dynamic classifiers, optionally including policy information such as application rate, session states, quota, status of policers, and statistics counters, as payload over mobility management messaging.

Embodiments of the present invention provide various technical advantages over conventional methods and apparatuses for allocating resources in a network node, such as provisioning and transferring classifiers as a subscriber moves via a soft handoff to a different network element. Some of these technical advantages are shown and described in the description of the present invention with respect to the accompanying figures. Certain embodiments of the present invention may enjoy some, all, or none of these advantages. Other technical advantages may be readily apparent to those skilled in the art from the following figures, description, and claims.

Figure 1:
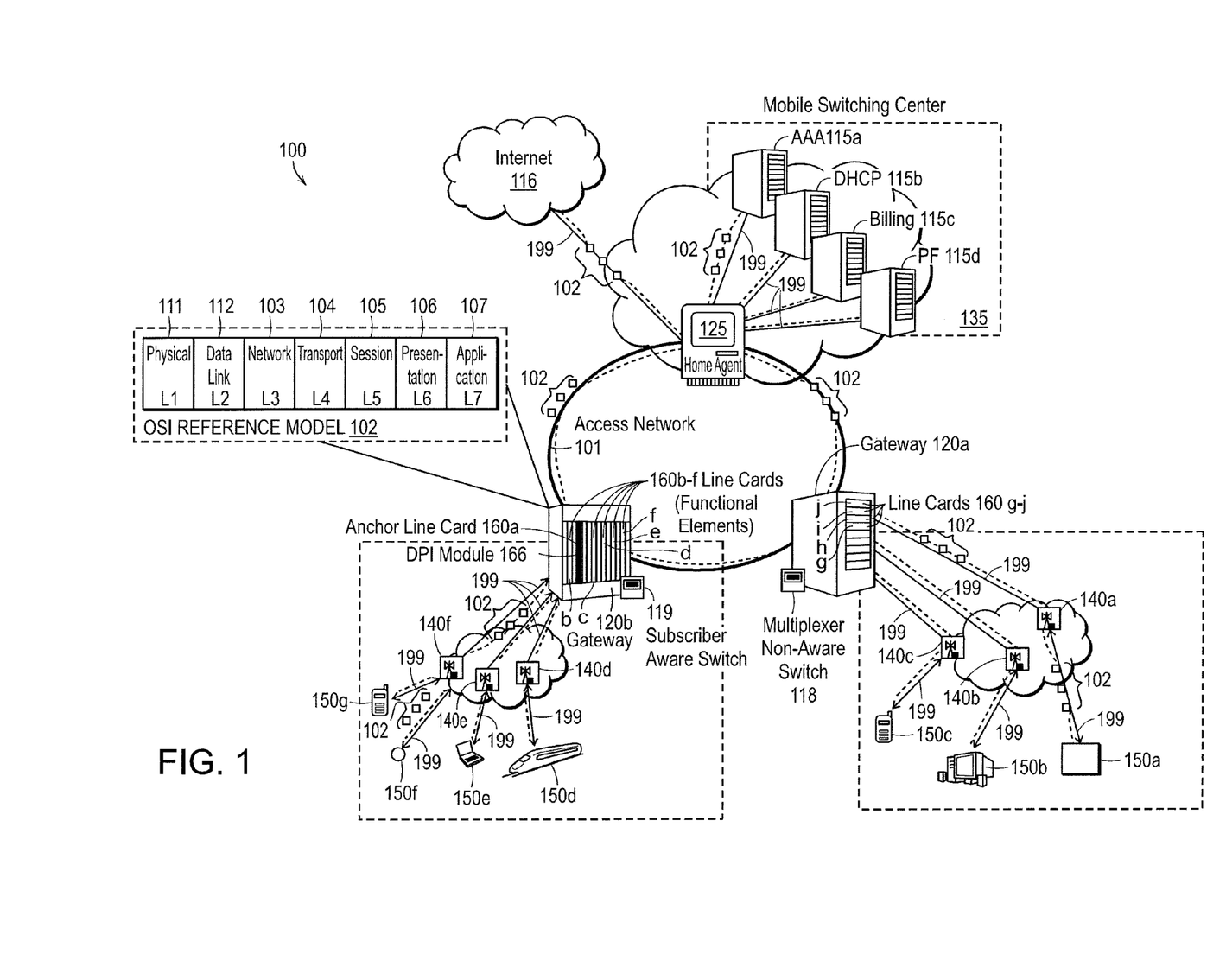
FIG. 1 is a network diagram of a prior art access portal and an embodiment of the invention that illustrates network elements operably interconnected via wireline or wireless mediums.

FIG. 1 is a network diagram of a network 100 illustrating aspects of an example embodiment of the invention. The network 100 can be any type of network with wireless access, such as a wide area network (WAN) having wireless access thereto, wireless broadband network employing a Worldwide Interoperability for Microwave Access (WiMax) network, High Speed Packet Access (HSPA) network, $3^{rd}$ or $4^{th}$ Generation Partnership Project Long Term Evolution (3GPP LTE) network, or other commonly employed or hereafter-developed network. The network 100 can include at least one access network 101 to interconnect operably with a number of network elements, including, for example, mobile end user devices (hereinafter "mobile devices") 150a-g.

The access network 101 can connect basic network elements such as a mobility management entity (MME) (not shown), home location register (HLR) (not shown), home agent 125, gateways 120a-b, or other known network elements. The access network 101 connects to at least one base station 140a-f, either directly or through additional networks, such as an edge network (not shown), which connect mobile devices 150a-g via a telecommunications interface or wireless medium, e.g., an air interface. The home agent 125 further connects the wireless network to external networks, e.g., the Internet 116 or a mobile switching center 135 containing service portals 115a-d. The service portals 115a-d can include a multitude of service types, for example, an authentication, authorization, and accounting (AAA) server 115a, dynamic host configuration protocol (DHCP) server 115b, billing server 115c, home policy function (PF) server 115d, or other type of portal that may be used at the mobile switching center.

The AAA server 115a may provide authentication services to validate a subscriber, authorization to determine the subscriber's rights, and accounting to determine subscriber's usage. The DHCP server 115b may provide for address allocation services in a manual, automatic, or dynamic manner, or as otherwise provided by a network administrator. The PF server 115d may provide general policy rules or application dependent policy rules. The PF server 115d may evaluate network requests against the policies and may be associated with a home policy database, which may be associated with a network service processor (NSP) (not shown).

For example, continuing to refer to FIG. 1, the traffic 102, originating at a mobile device, such as mobile device 150b, may travel upstream toward the base station 140b via wireless medium 199, which, in turn, may forward the traffic 102 to the gateway 120a via the wireless medium 199. The gateway 120a can be any of a multitude of wireless gateways, including, for example, an Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway. In the example network 100, the gateway 120a may contain at least one functional element, or multiple functional elements in a chassis 160a-f; the functional elements can be, for example, a line card. The functional element 160a (described in more detail below in reference to FIG. 2) receives the traffic 102, from the downstream base station 140b, and may perform network resource functions prior to transmitting the traffic 102 to the home agent 125 or final destination.

Example embodiments of the present invention can include a deep packet inspection (DPI) module 166 located or operably connected to a network element, such as the gate 120b or a line card 160a-f. The DPI module (explained below in detail) enables packet inspection of the traffic packet 102 at a more detailed level. The traffic packet 102 can contain multiple layers of information, for example, an open systems interconnection (OSI) reference model of the traffic packet 102 seven layer stack. The OSI reference model includes a physical layer (L1) 111, data link layer (L2) 112, network layer (L3) 103, transport layer (L4) 104, session layer (L5) 105, presentation layer (L6) 106, and application layer (L7) 107. The DPI module can inspect some or all layers of a packet, including, layers L5-L7 in some embodiments.

An example embodiment of the present invention includes a subscriber-aware switch, such as switch 119 in FIG. 1, directs traffic from a subscriber to the specific line card where the subscriber's profile is maintained; for example, the switch can be configured to determine a subscriber profile associated with the communications traffic 102. Details of a subscriber-aware switch are described further in Applicants' pending U.S. patent application (Serial Number not yet assigned) being filed concurrently herewith, entitled "Method and Apparatus for Switching Communications Traffic in a Communications Network" by Santosh Chandrachood and Pawan Uberoy, which claims priority to Applicants' U.S. Provisional Patent Application No. 61/278,496, filed Oct. 7, 2009, entitled "A Method and Apparatus for Subscriber Distribution and Load Balancing Using Mid-Plane Design in a Subscriber Aware Platform Such as ASN Gateway, GGSN, SGSN etc." by Chandrachood et al., the entire teachings of both being incorporated herein by reference in their entirety. The switch 119 is a subscriber-aware switch and has knowledge of the subscriber's profile location, whereas previous switches are non-subscriber-aware switches, for example, such as a multiplexer switch 118, which merely switch traffic without being aware of the traffic's information.

Alternatively, example embodiments include DPI occurring at the subscriber-aware switch 119 in the data plane. Unlike the current state of the art that uses Internet protocol (IP) address for forwarding functionality. Embodiments of the present invention can read the data contents that a traffic packet or message may carry, including information beyond a normal router reading a layer 3 (e.g., IP address) address to make forwarding decisions. Further example embodiments of the present invention allow for the subscriber-aware switch to retain historical or payload (or other) information in the subscriber-aware switch or module accessible to the subscriber-aware switch after forwarding of the traffic is completed.

Figure 2:
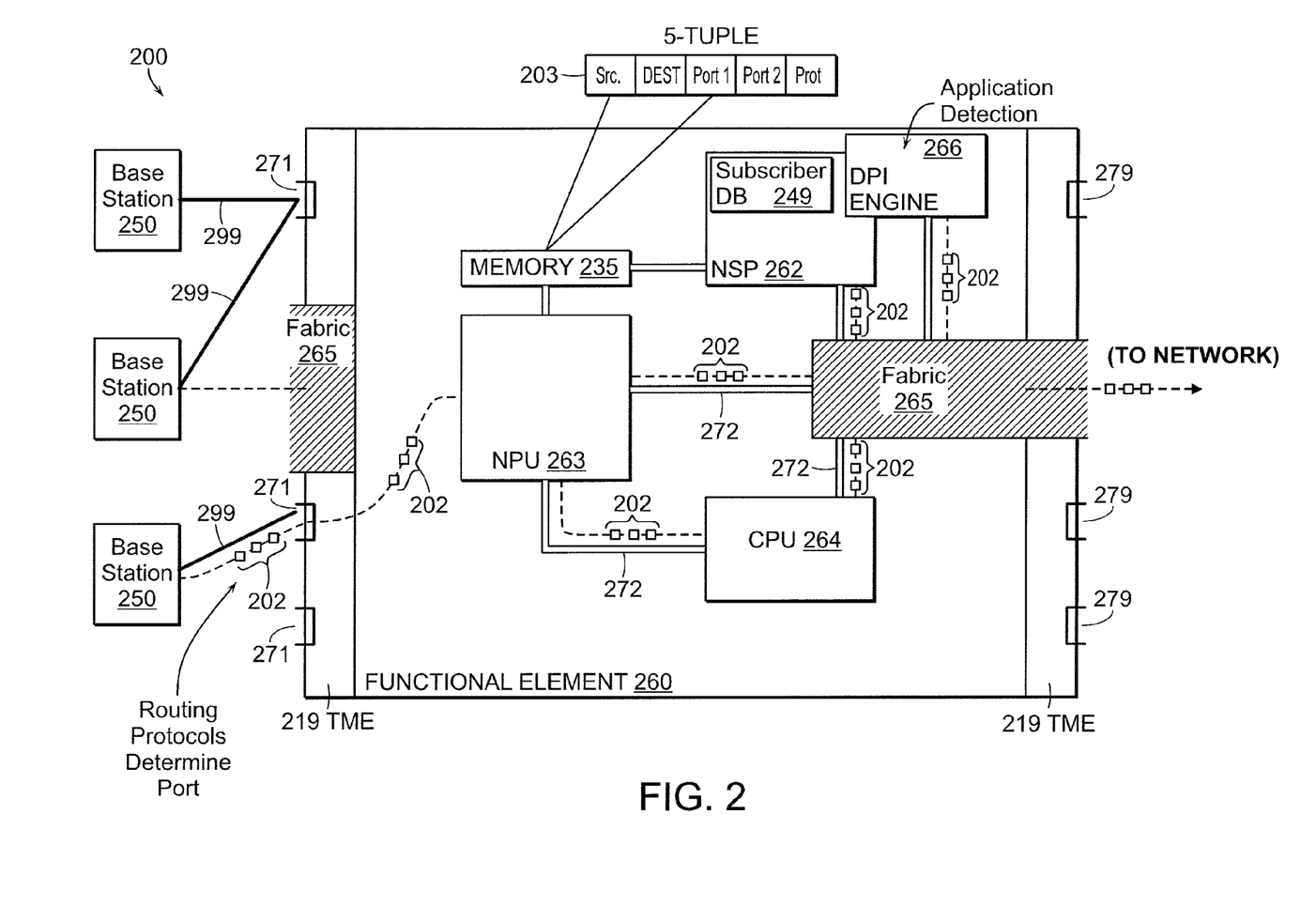
FIG. 2 is a block diagram of an embodiment of the invention that illustrates a functional element.

FIG. 2 is a block diagram 200 of functional element 260 illustrating an example embodiment of the invention.

To begin processing, a traffic packet 202 is sent by a base station 250, via a wireless interface 299, and received by a traffic management entity 219 at the functional element 260, via one of multiple ingress-interface ports 271. Alternatively, the traffic packet 202 can enter the NPU 263 directly. The ingress-interface ports 271 being decided by a routing protocol of the traffic packet 202 from the base station 250 to determine which port to enter. Alternatively, example embodiments of the present invention may include other methods of determining port entrances. The traffic packet 202 enters a network processing unit (NPU) 263 via an NPU interface (not shown). The NPU 263 may perform any number of functional operations, including, for example, determining routing information, manipulating data, processing control information, allocating packets, determining quality of service (QoS) parameters, or other commonly known or hereafter developed functions. Details of QoS are described further in Applicants' pending U.S. patent application (Serial Number not yet assigned) being filed concurrently herewith, entitled "Method and Apparatus to Report Resource Values in a Mobile Network" by Santosh Chandrachood, which claims priority to Applicants' U.S. Provisional Patent Application No. 61/278,520, filed Oct. 7, 2009, entitled "A Method and Apparatus to Read Large Hardware Counters in a Scalable Way" by Chandrachood et al., the entire teachings of both being incorporated herein by reference in their entirety.

The NPU 263 can forward the traffic packet 202 to a network service processor (NSP) 262 via a bus 272, such as a traffic bus or PCI bus, or via a fabric 265. The NSP 262 may contain subscriber information or a subscriber database 249; the NSP 262 can maintain a deep packet inspection (DPI) engine 266, or, alternatively, may be interconnected operably to a DPI engine located elsewhere in the same or external network node.

In alternative example embodiments of the present invention, following receipt of the DPI-learned information, the NPU 263 can store the DPI-learned information in a memory 235, which can be a ternary content addressable memory (TCAM) or other finite memory currently employed or hereafter developed. The NPU 263 can dynamically create a hash table entry 203, such as a 5-tuple entry, in the memory 235, which points to the DPI-learned information. The 5-tuple entry can include information regarding the traffic packet 202, such as a source, destination, first port, second port, and protocol to be used. Further, the NPU 263 may determine hardware resources, based on DPI-learned information, in real time. The NPU 263 can use multicast messaging to scale network resources by employing the hash table entry 203.

Following process completion of DPI, the NPU 263 can forward the packets 202 to an additional functional element (not shown) using the fabric 265, or the NPU can transmit the processed packets to an element external to the functional element 260 via any output-egress port 279. The output-egress port 279 can be determined based on the routing protocol of the traffic packet 202 in the packet header or, for example, a protocol stored in the 5-tuple entry of the memory 235.

Alternative embodiments of the present invention may include a module or set of modules in the NSP 262 that collect subscriber information that can include subscriber identifiers, subscriber QoS parameters, or additional subscriber information, any of which may be passed between or among the NPU 263, NSP 262, or CPU 264 as a specialized packet (not shown). In further alternative embodiments, it is possible to collect information and assign resources because the NPU 263 and NSP 262 are operably interconnected. The NPU 263 does not have to pre-program contexts (e.g., policers, forwarding entries, QoS parameters, classifiers, etc.) such that the hardware resources are statically reserved. Such embodiments enable dynamic resource allocation upon detection of useful or needed resources based on deep packet inspection.

Additional embodiments of the invention include the DPI engine 266 parsing the traffic packet 202 in order to extract information regarding subscribers in the network, including such information as types of protocols used, channel data, codec rates, or other such properties that may support further adjustments to be made. When operating, the DPI engine 266 uses the information extracted from the traffic packet 202 in order to allocate and de-allocate resources used to support a call, such as a voice call, to be guaranteed or have high (or low) priority. The DPI engine 266 can generate a mobile signal, establish bearer services, use the codec rates, assign local quality of service (QoS) resources, monitor a control channel for completion of a session, de-allocate resources, or perform additional operations currently employed or hereafter developed useful for DPI. Alternatively, an example embodiment of the present invention can include hardware for DPI, such as a multi-core cluster. The DPI engine 266 can signal a CPU or multiple CPUs used together to allocate or de-allocate resources used to support a call, such as voice call using voice over Internet protocol. Details of resource allocation or assignment are described further in Applicants' pending U.S. patent application (Serial Number not yet assigned) being filed concurrently herewith, entitled "Method and Apparatus for Assigning Resources in a Network Node" by Santosh Chandrachood, which claims priority to Applicants' U.S. Provisional Patent Application No. 61/278,486, filed Oct. 7, 2009, entitled "A Method and Apparatus to Allocate Network Processing Unit Resources Dynamically in Fast Path Without Host CPU Involvement and Without Statically Holding Up Resources" by Chandrachood, the entire teachings of both being incorporated herein by reference in their entirety. In alternative example embodiments, a line card may include only a CPU or multiple interconnected CPUs, which can be interconnected to the DPI engine 266, or operate without the data plane using control channels in the control plane.

In an example embodiment of the present invention, the DPI engine 266 can be operably connected to any of the NSP 262, CPU 264, fabric 265, memory 235, or NPU 263, or other commonly known or hereafter developed hardware elements or network elements via a bus 272. The bus 272 can be, for example, a PCI bus or a traffic bus that can operate at traffic rates or multiples thereof. The DPI engine 266 can parse multiple levels of the traffic packet, including Layers 4-7 as described below in reference to FIG. 5, in order to determine information about the traffic packet that would otherwise not be known from a simple review of the packet header (as is customary in the art). By mining the traffic packet 202, the DPI engine 266 learns information about a subscriber by associating the subscriber's profile with the traffic packet 202, thereby allowing other devices of the network node to cause base stations involved in transmission of the packet 202 to adjust bandwidth parameters, complete soft-handoffs between base stations, and monitor base station states for traffic management purposes in order to support traffic packets associated with the subscriber profile.

Further example embodiments of the present invention include modules that can identify classifiers (e.g., parameters) associated with a traffic packet 202 to learn and associate with the packet or the subscriber's profile. Details of which are described in Applicants' pending U.S. patent application (Serial Number not yet assigned) being filed concurrently herewith, entitled "Method and Apparatus for Efficient Resource Allocation of Quality of Service Profiles in Mobile Networks" by Santosh Chandrachood and Henry Fung, which claims priority to Applicants' U.S. Provisional Patent Application No. 61/278,505, filed Oct. 7, 2009, entitled "A Method and Apparatus for Efficient Resource Allocation of Quality of Service Profiles in Mobile Networks" by Chandrachood et al., the entire teachings of both being incorporated herein by reference in their entirety. The classifiers can be 5-tuple classifiers, for example, including a source Internet protocol (IP) address, destination IP address, source port, destination port, and protocol type. The 5-tuple classifiers can be employed in some embodiments to understand policy information and to create or manage QoS profiles in a dynamic manner, or some or all of which allow a subscriber-aware node or mobility management entity (MME) to adjust parameters (e.g., QoS parameters) dynamically in a network by signaling a node in the network or transmitting a mobility management message to an element in the network.

In alternative example embodiments, QoS allows for resource reservation and control, such that embodiments of the present invention can provide different priorities to different elements of the network, including, for example, providing different services based on applications, subscribers, performance level, data flows, or other commonly known or hereafter developed elements requiring QoS specifications. QoS parameters can include, for example, delay, jitter, bit rate, guarantees, bandwidth, or other commonly employed or hereafter-developed parameters useful for QoS in a network.

In alternative example embodiments of the present invention, network resources or hardware resources can be provisioned, assigned, allocated, or de-allocated. Resources can include, for example, NPU, CPU, or other hardware resources such as search capabilities, ternary content adjustable memory (TCAM), control functions, statistics, memory channels, fabric buffering memory, fabric backplane, or other commonly known or hereafter developed network resources.

Figure 3:
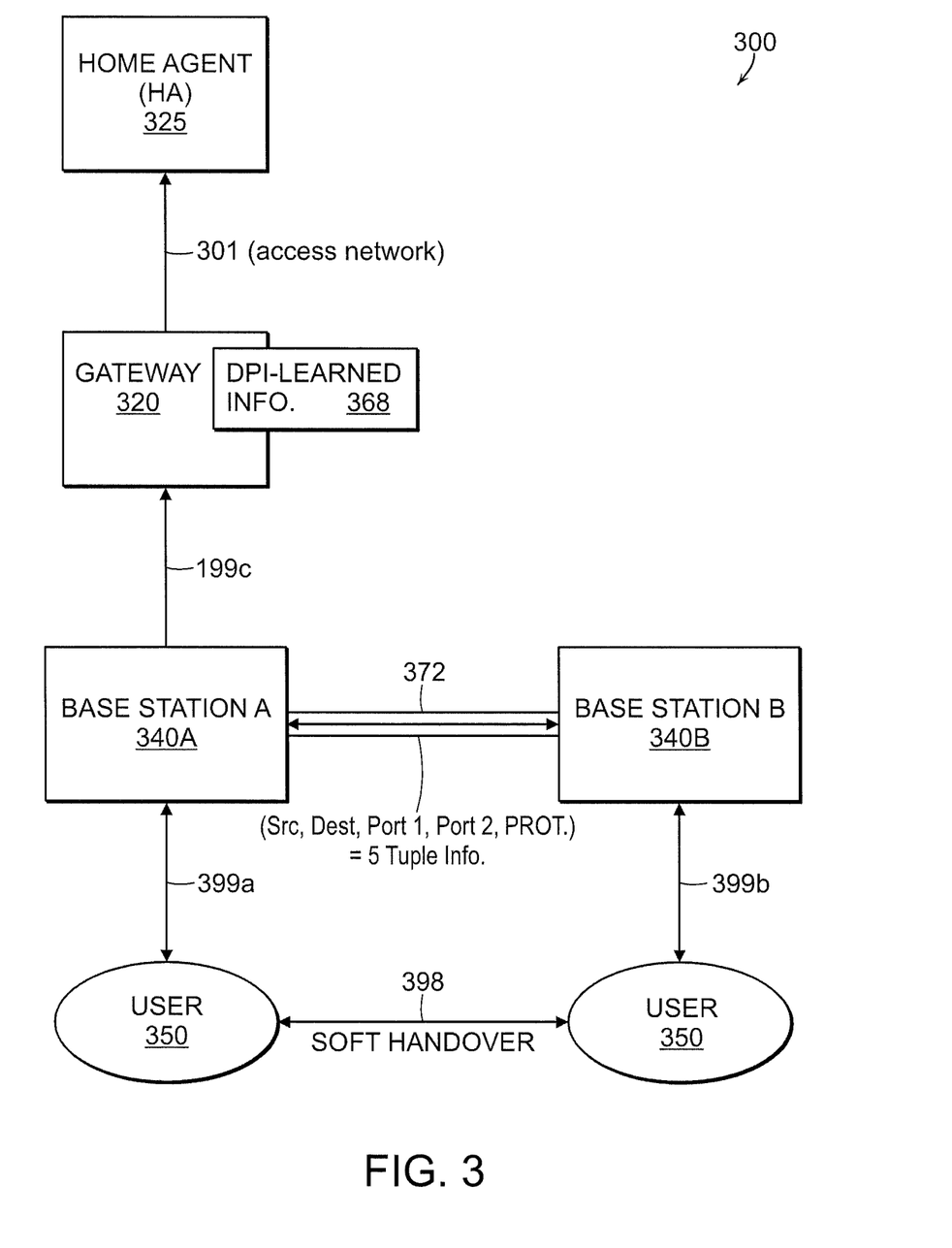
FIG. 3 is a system line diagram of an embodiment of the invention that illustrates interconnected network elements.

FIG. 3 is a system diagram 300 of a portion of a mobile network illustrating an example embodiment of the invention.

Example embodiments of the present invention may use information learned from deep packet inspection (DPI) 368 in many network situations, such as during a soft-handoff between base stations 340*a-b* or between other network elements. If a subscriber device 350 enters a mobile network, such as the network 100 in FIG. 1, the subscriber device 350 can connect to a base station 340a-b in order to connect to the network. The subscriber device 350 may connect via a medium 399, which can be a wireless medium such as air, and further connect from the base station A 340a to a network gateway 320, such as the gateways 120a-b in FIG. 1. The gateway 320 can connect to a home agent 325 via an access network (as explained in reference to FIG. 1). In the system diagram 300, if the subscriber device 350 moves away from the base station A 340a and closer to a different base station, such as the base station B 340b, the subscriber's connection may have to be transferred to the base station B 340b or another base station in range (not shown) in order to maintain access to the network or other reasoning currently known or hereafter-determined for changing access entrance to a network.

A soft-handoff 398 can occur between the base station A 340a and the base station B 340b via a connection, such as a traffic bus 372, or other known or future-developed logical or physical connection. For example, the subscriber device 350 may be connected to the base station A 340a with given parameters, such as a non-congested state parameter, but the subscriber device 350 is moving into a congested area of the base station B 340b. Employing example embodiments of the DPI (as described in FIG. 5) allows a base station to change parameters such that context transfer, between the base station A 340a and the base station B 340b, can be adjusted accordingly. In other embodiments of the present invention, DPI-learned information 368 can be used with regard to a location of the base station when, for example, a state of affairs of quality of service (QoS) may change between base stations. The base station A 340a can share the 5-tuple information, QoS policies, or parameter adjustments of parameter classifiers with the base station B 340b during or before a soft handoff between the base station A 340a and the base station B 340b.

In alternative example embodiments, DPI can enable a base station to change service parameters of other subscriber devices accessing the base station based on location or congestion of the new base station. Additional embodiments may add queues, for example, advertisements, such that a database, for example near an authentication, authorization, and accounting (AAA) server as in FIG. 1, can transmit a context-specific advertisement or other message during a soft-handoff transfer between base stations. Alternative example embodiments may include queues or databases for other location-specific information or adjust content based on physical location of the subscriber device using DPI-learned information.

In one example embodiment, using session initiation protocol (SIP) signaling, voice over Internet protocol (VoIP) traffic can be sent via a real-time transport protocol (RTP) stream in an RTP channel VoIP information can be embedded in a control channel of the SIP. Employing DPI, embodiments of the present invention can access and review the embedded information or parameters and can signal a base station to use specific 5-tuple information discovered by extracting the DPI information from the VoIP traffic packet.

In an alternative embodiment, the DPI-learned information or classifiers can be transmitted to a base station from a mobility management entity or other network element commonly employed or hereafter-developed network-based mobility management entity.

Figure 4A:
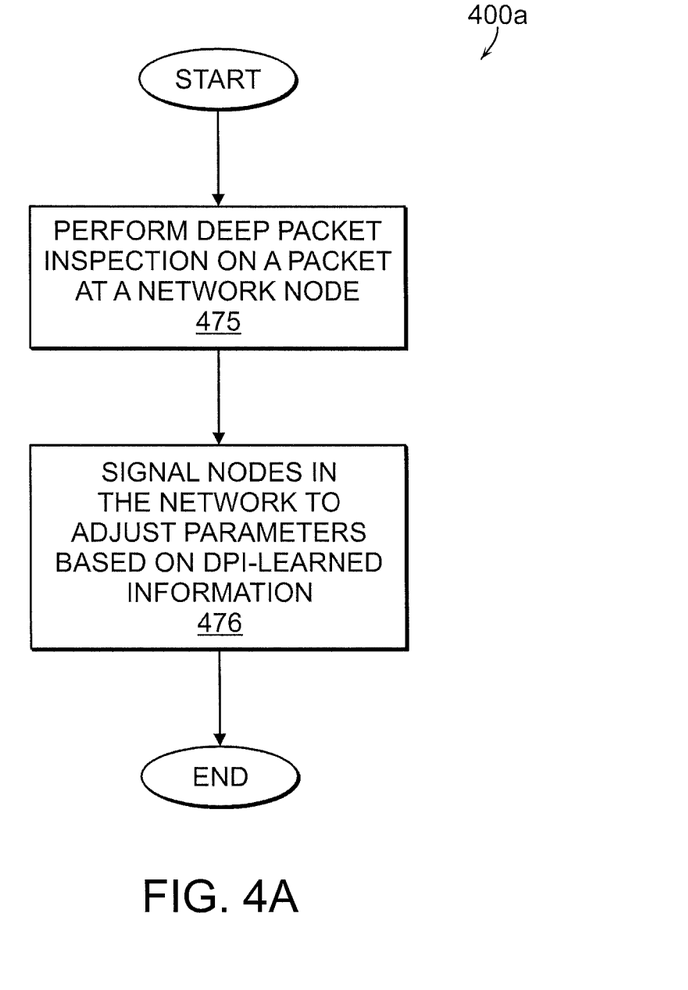
FIG. 4A is a flow chart of an embodiment of the present invention that illustrates functions involved in deep packet inspection.

FIG. 4A is a flow chart 400a of an embodiment of the present invention illustrating functions involved in deep packet inspection (DPI). Performing DPI on a traffic packet at a network node (475), such as the gateway 120b of FIG. 1, in order to learn information from a header and a payload of the packet or other traffic, for instance, information located in the session layer (layer 5), the presentation layer (layer 6), or the application layer (layer 7). Following determination of DPI information, the network node, which can have access to modify other network elements or allocations on the network, performs signaling a node in the network to adjust resource parameters (476), such as 5-tuple classifiers. The signaling (476) can include delivering the resource parameter information, such as DPI-learned information, to a second node in the network during periods of network flux or determined need for a change in capacity. Alternative example embodiments of the present invention include signaling nodes in the network for requesting services from the mobile network or delivering services to the mobile network. In alternative embodiments, each node on the network may perform DPI on traffic received at the node and each node can be enabled to request or deliver services or service information to other nodes in the network.

Figure 4B:
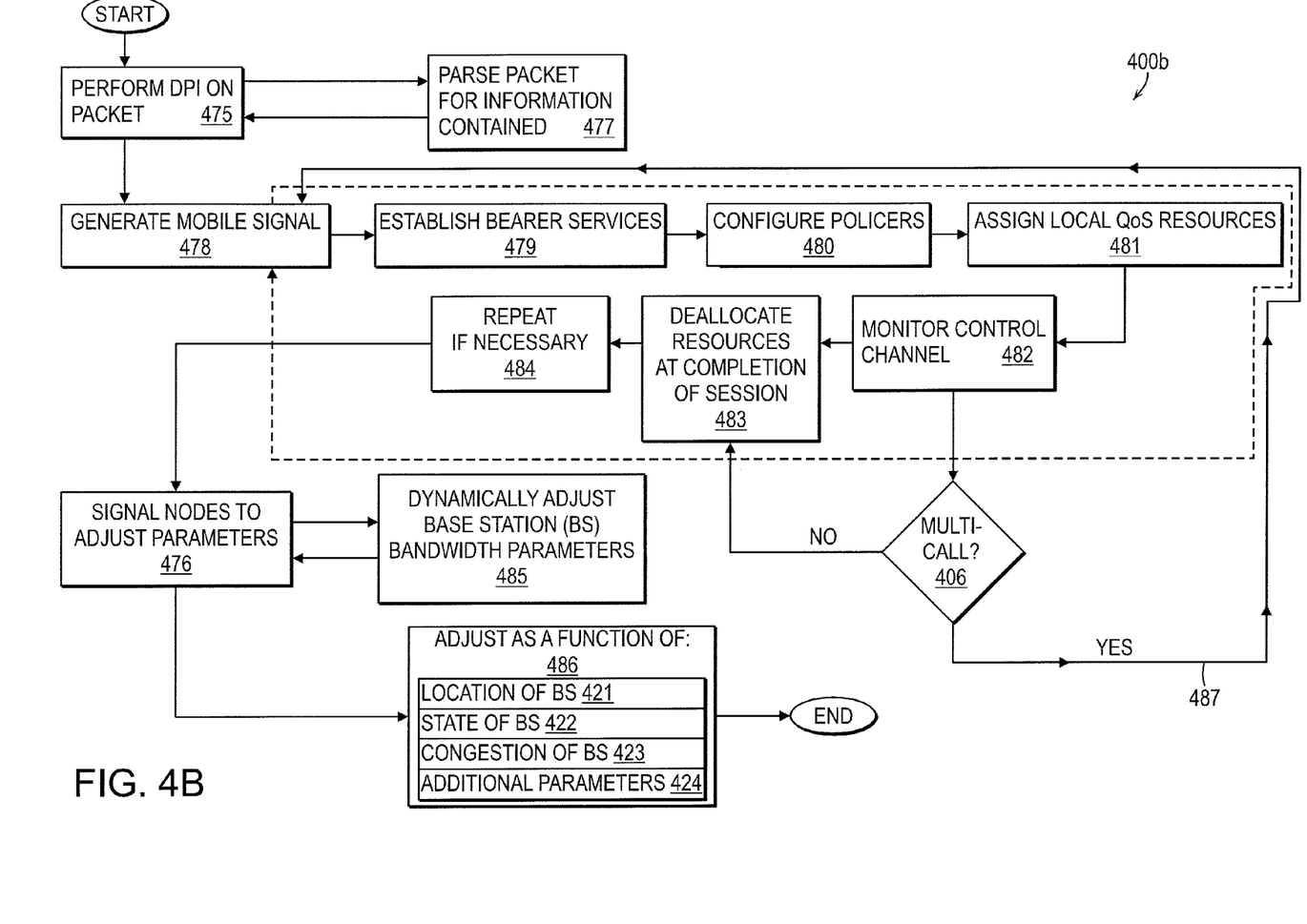
FIG. 4B is a flow diagram of an embodiment of the present invention that illustrates a method of performing deep packet inspection.

FIG. 4B is a flow diagram 400b illustrating an example embodiment of the present invention. After beginning, a deep packet inspection (DPI) module (as described below in FIG. 4C) can perform DPI on a traffic packet in a network, such as the network 100 in FIG. 1 (475); performing DPI on the traffic packet in this example includes parsing the traffic packet for information contained in any of layers 1-7 (477). Following DPI performance, the DPI engine can generate mobile signaling, for example, in one instantiation, within R6, R1 messages in WiMAX (478). The DPI engine establishes bearer service for real-time transfer protocol (RTP) traffic or voice over Internet protocol (VoIP) traffic end-to-end (479), such that traffic or signaling can be transmitted between different network interfaces. The DPI engine uses a codec rate to set up policers (480) and assigns local QoS resources for the RTP traffic (482).

The flow diagram 400b further monitors a control channel, for example, monitoring a control channel using session initiation protocol (SIP), in order to determine or detect if multi-way calling is present (482). In an example embodiment where multi-way calling is detected 406, the DPI engine performs another cycle for each subscriber in the multi-way call. In another example embodiment, the control channel is monitored in order to detect a call completion signal; for example, a calling subscriber may terminate the call by turning off the device. Upon receiving a call completion signal, the flow diagram 400b provides for end-to-end service parameters and transports (e.g., radio bearer and mobile device contexts) to be terminated and resources to be de-allocated (483), some or all of which being continuously or intermittently repeated as necessary (484).

Alternatively, in another example embodiment of the present invention, nodes in a network can be signaled, for example, by the DPI engine, to adjust the parameters at the signaled node (476) or nodes which can be signaled to adjust base station bandwidth parameters (485) dynamically. Alternatively, network nodes can be signaled or otherwise communicated with in methods commonly known or hereafter-developed, such that adjustments can be made (486) as a function of a multitude of bases, including, for example, a location of the base station (421), state of the base station (422), congestion at the base station (423), or other methods of adjusting parameters currently employed or hereafter-developed.

Figure 4C:
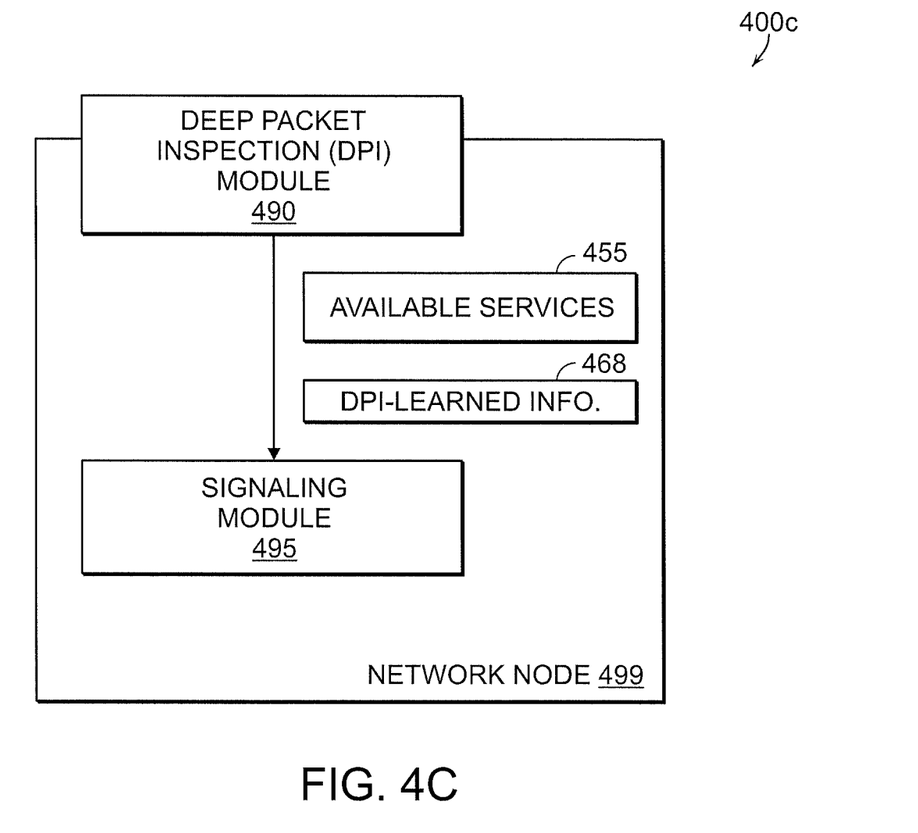
FIG. 4C is a block diagram of an embodiment of the invention that illustrates components involved in deep packet inspection.

FIG. 4C is a block diagram 400c of a network node 499, such as the gateway 120b of FIG. 1, illustrating aspects of an example embodiment of the invention. The block diagram 400c can be a physical or logical representation and may exist, for example, in a line card at a node in a network, such as the example network 100 of FIG. 1. According to the example embodiment of block diagram 400c, a deep packet inspection (DPI) module 490 may include a DPI engine that can perform DPI on a packet or traffic in the network. The DPI module 490 can pass information, such as a subscriber's available services 455 and DPI-learned information 460, to a notification module 495. The notification module 495 may use the DPI-learned information 460 and the subscriber's available services 455 to signal a node in the network to adjust resource parameters.

Figure 5:
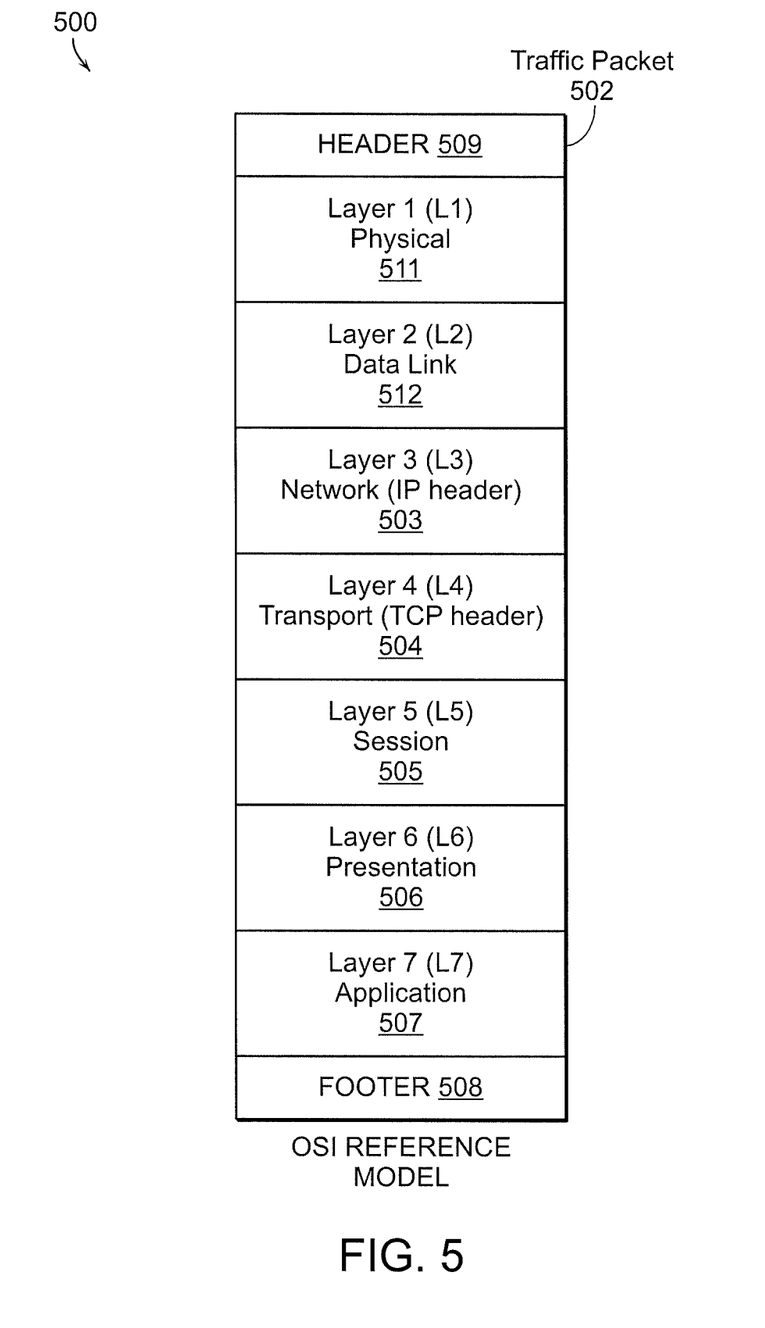
FIG. 5 is a diagram of an embodiment of the invention that illustrates a traffic packet.

FIG. 5 is a diagram 500 of an embodiment of the invention illustrating a traffic packet 502 in an open systems interconnection (OSI) reference model.

In the example embodiment of FIG. 5, deep packet inspection (DPI) can include a DPI engine, such as DPI engine 266 of FIG. 2, or any network equipment configured for inspecting traffic and using information from within the packet, to perform or cause other network modules or nodes to perform functions in the network. Network functions can include, for example, quality of service (QoS), resource allocation, statistics, or other commonly known or hereafter-developed network functions. Internet protocol (IP) traffic packets may have a number of different headers, depending on the layers through which the packet has been transmitted; however, network elements need only use an IP address for normal network forwarding. DPI enables advanced packet examination reaching deeper layers of the packet beyond the header and IP address information. While DPI can be used to inspect all levels of a traffic packet, such as the physical, data link, or network layers, this type of inspection is normally termed shallow packet inspection. DPI can be used to view layers 4-7 of the IP data and provide a more detailed understanding of the type of traffic transported in a network.

In the example embodiment of diagram 500, a traffic packet 502 is illustrated using the OSI reference model, which is one type of model to view or divide a communications network into smaller categories, such as layers. Each layer of the OSI reference model can communicate with the layer directly above or directly below itself. Layer 1 (L1) is a physical layer 511; the physical layer defines electrical or physical relationships between network elements and a medium for transmitting traffic. The medium can be any medium currently employed or hereafter developed for transmitting traffic in a communications network, for example, air, optical fibers, or copper cable. Layer 2 (L2) is a data link layer 512; the data link layer 112 transfer data between network elements using functions and procedures at that layer. Layer 3 (L3) is a network layer 503; the network layer 503 performs network routing functions and possible quality of service optimization requested at other network elements or packet layers. Layer 4 (L4) is a transport layer 504; the transport layer 504 enables end-user traffic transfer; typical examples include transmission control protocol (TCP) or user datagram protocol (UDP). Layer 5 (L5) is a session layer 505, which manages local and remote application connections in a network. Layer 6 (L6) is a presentation layer 506 that provides correspondence between application layer entities that may have different semantics. Layer 7 (L7) is an application layer 507. The application layer 507 interacts with a software application that an end-user employs via a user interface of the software application.

In alternative example embodiments of the present invention, other reference models, such as a TCP/IP protocol stack reference model, may be used to understand or program deep packet inspection modules. Alternative embodiments may also maintain deep packet inspection modules at any location or network element in a communications network, such as the network 100 in FIG. 1.

In alternative example embodiments, all features presented herein could be used for any application traffic, including VoIP traffic, Peer-to-Peer traffic, bit-torrent traffic, or any commonly employed or hereafter developed application traffic.

Further example embodiments of the present invention may include a non-transitory computer readable medium containing instructions that may be executed by a processor, and, when executed, cause the processor to monitor the information, such as components or status, of at least a first and second network element. It should be understood that elements of the block and flow diagrams described herein may be implemented in software, hardware, firmware, or other similar medium determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application-specific processor loads and executes software in a manner well understood in the art. It should be understood further that the block and flow diagrams illustrating embodiments of the present invention may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for dynamically adjusting network resources, the method comprising:
    performing deep packet inspection (DPI) on a packet in a mobile network at a subscriber-aware network node, the subscriber-aware network node having access to modify network allocations using DPI information;
    adjusting resource parameters in the subscriber-aware network node, or notifying a node in the mobile network to adjust resource parameters, said adjusting the resource parameters being performed as a function of information learned by the DPI and services available to a subscriber in the mobile network;
    generating mobile signaling;
    establishing bearer services for application traffic end-to-end;
    using codec rates to configure policers;
    assigning quality of service (QoS) resources for application traffic;
    monitoring a control channel and detecting multi-way calling;
    repeating the generating, establishing, using, assigning, and monitoring if multi-way is calling detected; and
    deallocating application resources following completion of an application session, including the end-to-end service parameters and transports in the mobile network.

2. The method of claim 1 wherein performing the DPI further includes parsing the packet to extract subscriber information, application channel data, codec rates, or properties.

3. The method of claim 2 further comprising configuring the multi-way calls using parameters extracted for each calling party in the multi-way calling.

4. The method of claim 1 wherein notifying the node in the mobile network includes causing a base station to adjust bandwidth parameters.

5. The method of claim 4 further comprising adjusting the parameters as a function of a location of the base station, as a function of a state of the base station, or as a function of congestion of the base station during a soft-handoff.

6. The method of claim 5 wherein, following completion of soft-handoff over mobility management messaging, incorporating classifiers associated with the packet into a context of the base station for immediate use, wherein the context includes at least one of a policer, forwarding entry, QoS parameter, or classifier.

7. The method of claim 1 wherein performing the DPI includes learning classifiers associated with the packet, the classifiers being 5-tuple classifiers, and further comprising associating corresponding policy information with payload-over-mobility management messaging.

8. The method of claim 7 further comprising:
creating dynamic quality of service (QoS) profiles based on the classifiers; and
transmitting the dynamic QoS profiles and classifiers to a base station from a mobility management entity (MME).

9. The method of claim 1 further including associating a subscriber profile, at the subscriber-aware node, with traffic in the mobile network.

10. The method of claim 1 wherein modifying network allocations at the subscriber-aware network node further includes causing network elements end-to-end from source to destination, or a subset thereof, to adjust quality of service (QoS) parameters.

11. The method of claim 1 wherein notifying the node in the mobile network includes signaling the node in the mobile network.

12. An apparatus for dynamically adjusting network resources in a network node, the apparatus comprising:
a deep pack inspection (DPI) module configured to
perform DPI, using a DPI engine, on a packet at a subscriber-aware network node in a mobile network, the subscriber-aware network node having access to modify network allocations;
a notification module configured to adjust resource parameters in the subscriber-aware network node, or notify the network node in the mobile network to adjust resource parameters, said adjusting the resource parameters being performed as a function of information learned using the DPI engine and services available to a subscriber in the mobile network; and
a communications processor configured to:
generate mobile signaling;
establish bearer services for application traffic end-to-end;
use codec rates to configure policers;
assign quality of service (QoS) resources for application traffic;
monitor a control channel and detecting multi-way calling;
repeat the generating, establishing, using, assigning, and monitoring if multi-way calling is detected; and
deallocate application resources following completion of an application session, including the end-to-end service parameters and transports in the mobile network.

13. The apparatus of claim 12 wherein the DPI engine is further configured to parse the packet to extract subscriber information, application channel data, codec rates, or properties.

14. The apparatus of claim 13 wherein the DPI module is further configured to use parameters extracted for calling parties in the multi-way calling.

15. The apparatus of claim 12 wherein the notification module is further configured to cause a base station to adjust bandwidth parameters.

16. The apparatus of claim 15 wherein the DPI module is further configured to adjust the bandwidth parameters as a function of a location of the base station, as a function of a state of the base station, or as a function of congestion of the base station during a soft-handoff.

17. The apparatus of claim 16 wherein, following completion of a soft-handoff over mobility management messaging, the notification module is further configured to incorporate classifiers associated with the packet into a context of the base station for immediate use, wherein the context includes at least one of a policer, forwarding entry, QoS parameter, or classifier.

18. The apparatus of claim 12 wherein the DPI module includes classifiers associated with the packet, the classifiers being 5-tuple classifiers, and further configured to associate corresponding policy information with payload-over-mobility management messaging.

19. The apparatus of claim 18 wherein the DPI module is further configured to:
create quality of service (QoS) profiles based on the classifiers; and
transmit the dynamic QoS profiles and classifiers to a base station from a mobility management entity (MME).

20. The apparatus of claim 12 wherein the DPI module is further configured to associate a subscriber profile with traffic in the mobile network at the subscriber-aware node.

21. The apparatus of claim 12 wherein the DPI module is further configured to cause network elements end-to-end from source to destination, or a subset thereof, to adjust quality of service (QoS) parameters.

22. The apparatus of claim 12 wherein the notification module is further configured to signal the node in the mobile network.

23. A computer program product including a non-transitory computer readable medium having computer readable instructions to dynamically adjust network resources in a network node, wherein the computer readable instructions when executed by a processor, cause the processor to:
perform deep packet inspection (DPI), using a DPI engine, on a packet in a mobile network at a subscriber-aware network node, the subscriber-aware network node having access to modify network allocations;
adjust resource parameters in the subscriber-aware network node, or notify a node in the mobile network to adjust resource parameters, said adjusting the resource parameters being performed as a function of information learned using the DPI engine and services available to a subscriber in the network;
generate mobile signaling;
establish bearer services for application traffic end-to-end;
use codec rates to configure policers;
assign quality of service (QoS) resources for application traffic;
monitor a control channel and detecting multi-way calling;
repeat the generating, establishing, using, assigning, and monitoring if multi-way calling is detected; and deallocate application resources following completion of an application session, including the end-to-end service parameters and transports in the mobile network.

\* \* \* \* \*